Jan. 31, 1961   M. N. MUSGRAVE   2,969,866
RHUBARB TRIMMER
Filed Oct. 18, 1957
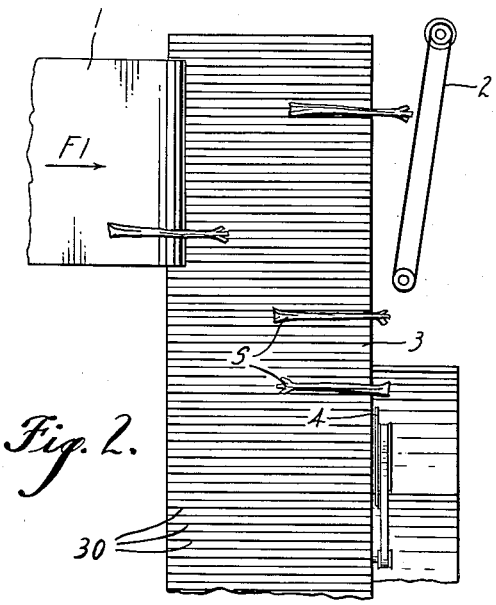
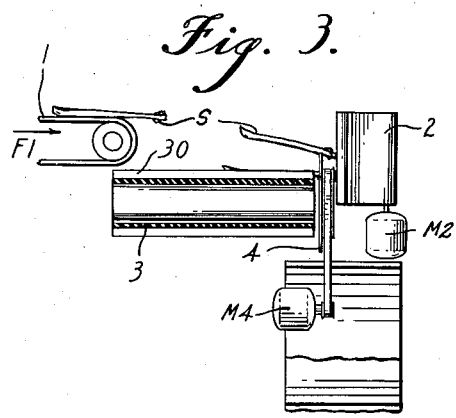
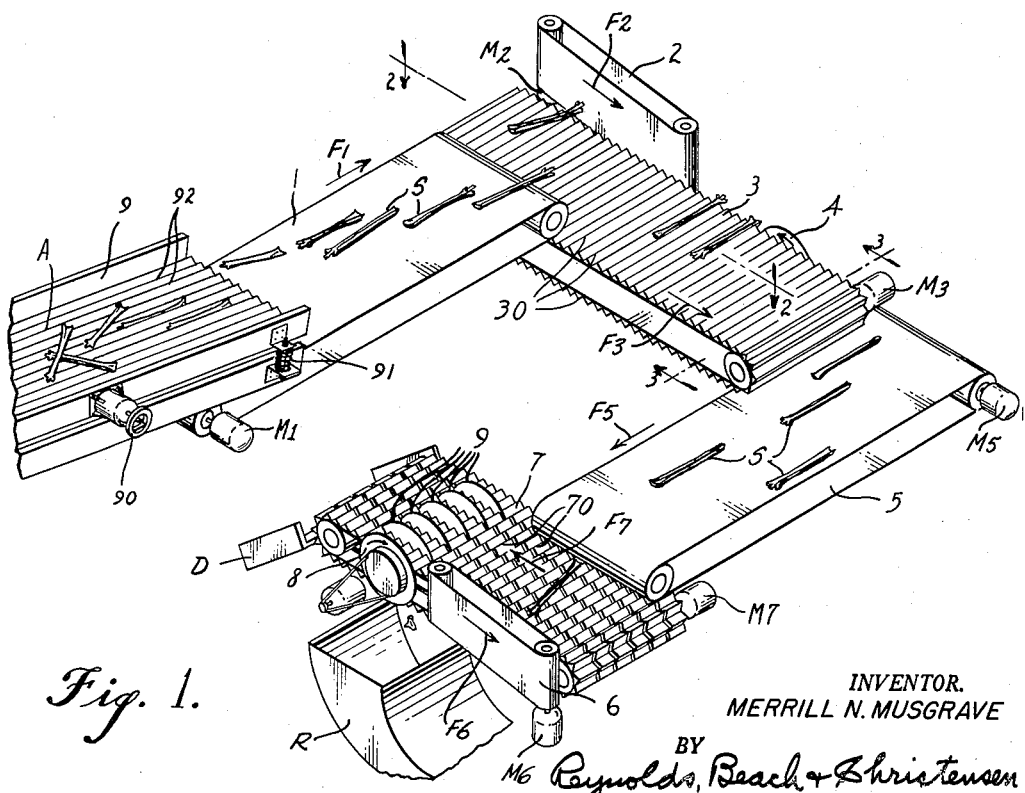
INVENTOR.
MERRILL N. MUSGRAVE
BY Reynolds, Beach & Christensen
ATTORNEYS

United States Patent Office 2,969,866
Patented Jan. 31, 1961

2,969,866
RHUBARB TRIMMER
Merrill N. Musgrave, 251 Securities Bldg., Seattle, Wash.
Filed Oct. 18, 1957, Ser. No. 690,936
4 Claims. (Cl. 198—29)

Rhubarb as a crop comes on rapidly, and the peak of the canning or freezing season is soon past. It is a bulky crop and relatively inexpensive, hence such handling as is required must be done in bulk and rapidly, in order to stay within a cost range that will leave a profit.

Rhubarb is pulled at the root end from the root of the plant, and the large leaves are cut off just above the fork at the top of the stalk. Thus gathered in the field, it is transported to processing installations. It dries rapidly at the two ends, and the root end tends to be of coarse quality. In order to preserve the quality of the pack it is customary to trim off each such end just before the stalks are cut into smaller pieces for packing. The individual stalks are of random length, some considerably shorter than others. Also, the root end of one stalk is likely to lie next to the leaf end of another stalk. All these factors contribute to an excessive amount of handling, which it is desirable to avoid.

It is the object of the present invention, in a specific application, to provide a method and a machine whereby stalks of rhubarb, of random length and without any particular orientation, may be brought quickly into parallelism, may be end-aligned at one end so that this end (whether that be the root end or the leaf end of any individual stalk is immaterial) may be trimmed off, and subsequently or simultaneously with the last end-trimming operation the stalks are cut up into short lengths for use. According to the present invention, the operations indicated are performed automatically and with large numbers of stalks, and at high speed.

In a larger sense the invention concerns the end-alignment of elongated articles such as rhubarb stalks, whatever may or may not be done to them once they are end-aligned. In this larger sense the invention concerns generically a machine and a method whereby such stalks, delivered in a mass in random disposition, can be brought into general parallelism and then into quite exact parallelism, and can be deposited with one end in alignment with the corresponding end of all other such stalks. The aligned ends, or their opposite ends, may be trimmed, or if all of the same length may by such end-alignment be prepared for deposition within a tray or other suitable container.

The objects of the invention having been indicated, the invention comprises the novel method and the novel machine, both as illustrated in the accompanying drawings in a typical form, and as will be described in greater detail in this specification, and the principles whereof will be set forth in the appended claims.

Figure 1 is a diagrammatic isometric view illustrating the essential elements of such a machine and the successive steps of the process.

Figure 2 is a plan view, also diagrammatic in character, indicating the end-aligning and trimming steps, the viewpoint being as indicated at 2—2 of Figure 1.

Figure 3 is a sectional view taken from the viewpoint indicated by the line 3—3 in Figure 1, illustrating the end-aligning and trimming steps.

Rhubarb in a jumbled mass is delivered to a feed point indicated by the letter A. The manner of delivering it to this feed point is not particularly material, although it should be such as will cooperate with a first feed belt 1, which receives the stalks and transports them from the feed point A. The delivery means has been typified by an inclined chute 9, down which the stalks may slide onto the belt 1. This chute may be quiescent, but preferably is vibratory. A vibrator 90, such as a motor-rotated off-center weight, causes the chute to vibrate, it being supported by springs 91. This vibration affords the jumbled mass of stalks opportunity to straighten out, oriented lengthwise of the chute as they slide down it. Longitudinal ridges 92 on the surface of the chute assist in aligning and maintaining the stalks parallel, once they have come into parallelism. Their ends, however, are still at random spacings.

The belt 1 is suitably driven, as for instance by a motor M1, at a rate of speed which is fairly rapid, and the importance of which will be made clear hereinafter. The rhubarb travels in the direction indicated by the arrow F1. As the stalks slide from the chute 9 onto the belt 1, being by then generally in parallelism, any portion of the stalk, usually an end, which first touches the rough-surfaced belt will be drawn in the direction of the arrow F1, and the opposite end, dragging on the chute 9, will trail directly behind the end which first touches the belt, wherefore the orientation of the stalks, designated by the letter S, more or less lengthwise of the belt 1 is maintained or even is further assured, but not with any particular end forward. Some will have the leaf end forward and some will have the root end forward. Each, however, will be generally parallel to the others in the direction of travel F1.

The speed of the belt 1 is sufficiently rapid that the stalks will acquire sufficient momentum, by the time they reach the end of the belt, that they are projected endwise beyond the end of the belt until they meet a barrier, generally indicated by the numeral 2. This barrier might be a fixed board, but preferably it is a belt driven by motor M2 and traveling in the direction of the arrow F2. This barrier, upstanding in the path of the projected stalks, halts them, and tends to align their leading ends as they drop upon a transverse transfer belt 3, which is driven by means such as a motor M3 in the direction indicated by the arrow F3. In dropping, they remain in their parallel relationship, and may be so retained by upstanding transverse cleats 30, so that as they travel in the direction F3 they are oriented transversely of that direction.

As has been indicated, the barrier 2 is preferably a traveling belt, and is driven at a rate consonant with the drive of the motor M3, so that the belts 2 and 3 move at the same rate of speed. Moreover, the belt 2 is preferably inclined with relation to the direction of advance of the belt 3. It may happen that some stalks will bounce back from the barrier 2, and others will not, or will to a lesser distance. The inclination of the barrier 2, best seen in Figure 2, will push back any stalks the end whereof lies too far outwardly of the edge of the belt 3, until by the time the stalks pass beyond the end of the belt 2 their end-alignment is substantially perfected, although some stalks will have the leaf end outermost and others will have the root end outermost.

As they advance with the conveyor 3 they pass a cutter 4, which may be in the form of a rotating circular saw or knife, and the stalks project just far enough to trim off the desired amount from the end that projects beyond the edge of the conveyor belt 3. The cleats 30 prevent any skewing of the stalks as they are engaged by the cutter 4. It may be noted here that the speed of advance of the belt 3 is considerably less than the speed of advance of the belt 1, and the stalks will have a tendency to pile up upon the belt 3 and to maintain one another in proper disposition for end trimming, even though the cleats 30 were to be omitted, but the cleats are highly desirable to prevent disalignment by the cutter.

The stalks, when they reach the end of the conveyor means 3, and assuming that it is desired to trim the opposite end, are deposited upon a conveyor belt 5, driven by motor M5, which travels in the direction of the arrow F2, opposite to the direction of travel of belt 1. The belt 5 travels at a rate of speed comparable to the speed of the conveyor means 1. The stalks are now oriented lengthwise of the direction of travel F5, and so are flung, at the end of the belt, as before, against a barrier 6, which may be again in the form of a traveling belt driven by a motor M6 in the direction indicated by the arrow F6, and are received upon a conveyor means 7 which is driven by a motor M7 and travels in the direction indicated by the arrow F7. By inclining the barrier 6 the end-alignment of the stalks may again be perfected, and after they pass beyond the end of the barrier 6 they encounter an end trimmer 8, which trims off the second end of the stalks, and simultaneously or subsequently the stalks encounter a series of cutters 80, which cut the center portion, less the ends, into proper lengths for subsequent processing. Such lengths are delivered to a delivery point D, which may be in the form of a chute or other suitable receiver. The trimmed ends, it will be understood, are conveyed away by a receiver R. As before, it is preferred that the belts 7 have transverse cleats 70, for like reasons.

When handled by the process and the machine indicated the rhubarb is handled in bulk, yet the trimming of both ends is assured where that is desired, for each stalk is handled individually, as it were, as it is flung past the end of the belt 1 or the belt 5. If it is not desired to trim both ends, clearly one end can be trimmed by the cutter 4 and the stalks can then be delivered to any suitable receiver, or processed in any suitable manner subsequently.

The essence of the process resides in the flinging of the stalks endwise against the barrier and their alignment by impact thus against the barrier, whether or not the barrier is inclined, and whether or not it is moving. It is obvious that the stalks could be thus flung endwise in a number of different ways, as for instance, by pneumatic projection or the like. Subsidiary features include the preliminary aligning of the stalks as they are deposited upon the belt 1, so that although they arrive at the feed point A in a tangled or jumbled mass, they are sufficiently aligned upon the belt 1 to be projected endwise against the barrier 2.

I claim as my invention:

1. A machine useful in end-aligning stalks of rhubarb or the like, comprising means to deliver a supply of stalks to a feed station, a first belt moving beneath said feed station and receiving said stalks, means to align said stalks upon said first belt in general parallelism with each other and with the belt's direction of movement, means to advance said first belt and the stalks so aligned thereon at a rate sufficiently rapid to project the stalks endwise clear of the belt at its delivery end, a barrier disposed transversely of the path of the projected stalks, in position to intercept and halt the projection thereof, a second belt disposed beneath the barrier-halted stalks, moving transversely of the first belt and receiving the halted stalks in parallel disposition, transversely of and generally aligned at one end upon said second belt, a third belt disposed transversely of and beneath the delivery end of the second belt, to receive the stalks from the latter, each in disposition lengthwise of the third belt, means to advance said third belt, in a sense opposite to the advance of the first belt, at a rate sufficiently rapid to project the stalks, with their previously trailing ends leading, beyond its delivery end, a second barrier disposed transversely to the path of the so-projected stalks, in position to intercept and end-align the now leading ends of the stalks, and a fourth traveling belt disposed transversely to the third belt, in position to receive and advance the stalks halted by the second barrier.

2. A machine useful for end-aligning stalks of rhubarb or the like, comprising means to deliver a supply of stalks to a feed station, a first belt moving beneath said feed station and receiving said stalks, means to align said stalks upon said first belt in general parallelism with each other and with the belt's direction of movement, means to advance said first belt and the stalks so aligned thereon at a rate sufficiently rapid to project the stalks endwise through the air and clear of the belt at its delivery end, a barrier disposed transversely of the path of the projected stalks, in position to intercept and halt the projection thereof, an advancing second belt, means to receive the barrier-halted stalks, and to deliver the same in their previous parallel relation to said second belt, and in alignment with its direction of advance but with their previously trailing ends now leading, means to advance said second belt at a rate sufficiently rapid to project the stalks through the air beyond its delivery end, a second barrier disposed transversely to the path of the so-projected stalks, in position to intercept and end-align the now leading ends of the stalks, and means to convey away the stalks in their latter end-aligned relationship.

3. A machine useful in end-aligning stalks of rhubarb or the like, comprising a first conveyor means to advance stalks in disposition generally parallel and lengthwise of the direction of advance at a rate sufficiently rapid to project the stalks endwise, a barrier disposed transversely of the path of the projected stalks, in position to intercept and halt the projection thereof, a first receiving means disposed beneath and receiving the barrier-halted stalks, in parallel disposition and with their barrier-contacting ends generally aligned, and to advance them in a sense transversely of their direction of projection, a second conveyor means positioned to receive the stalks from said first receiving means, in the same general disposition, means to advance the second conveyor means with the stalks thereon endwise, but in the sense opposite to their advance with the first conveyor means, at a rate sufficiently rapid to project the stalks again endwise, but now with their formerly trailing end leading, a second barrier positioned to engage the now-leading ends of the stalks, to halt and to align them, and means disposed beneath and receiving the stalks halted by the second barrier, and arranged to advance them in parallel and end-aligned disposition but transversely of the direction of their last projection.

4. A method of end-aligning stalks of rhubarb or the like, which comprises aligning the stalks in general parallelism, but with their ends at random spacings, advancing them endwise at a rate of advance sufficiently rapid to project them endwise beyond a first terminal point, halting such projection by impact of their leading ends at a given distance beyond such terminal point, to leave such leading ends substantially aligned, supporting and advancing the end-aligned stalks in a direction transverse to their direction of projection, further advancing the stalks endwise, with their formerly trailing ends now leading, beyond a second terminal point, at a rate sufficiently rapid to project them again endwise, halting such projection in the same manner as before, and supporting and advancing the stalks in a direction transverse to their direction of second projection.

References Cited in the file of this patent

UNITED STATES PATENTS

| | | |
|---|---|---|
| 653,506 | Edwards | July 10, 1900 |
| 744,874 | Neeland | Nov. 24, 1903 |
| 808,067 | Briggs | Dec. 26, 1905 |
| 1,683,024 | Climer | Sept. 4, 1928 |
| 1,733,221 | Fuller | Oct. 29, 1929 |
| 1,927,345 | John | Sept. 19, 1933 |
| 2,092,103 | Blankeney et al. | Sept. 7, 1937 |
| 2,186,652 | Orth | Jan. 9, 1940 |
| 2,310,358 | Emmons | Feb. 9, 1943 |
| 2,416,690 | Hardy | Mar. 4, 1947 |
| 2,758,697 | Schultz | Aug. 14, 1956 |
| 2,877,883 | Lanham | Mar. 17, 1959 |